US012749934B2

(12) United States Patent
Honma

(10) Patent No.: US 12,749,934 B2
(45) Date of Patent: Sep. 29, 2026

(54) ROTARY ELECTRIC MACHINE

(71) Applicant: NIPPON STEEL CORPORATION, Tokyo (JP)

(72) Inventor: Rei Honma, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 273 days.

(21) Appl. No.: 18/720,463

(22) PCT Filed: Mar. 20, 2023

(86) PCT No.: PCT/JP2023/010902
§ 371 (c)(1),
(2) Date: Jun. 14, 2024

(87) PCT Pub. No.: WO2023/189824
PCT Pub. Date: Oct. 5, 2023

(65) Prior Publication Data

US 2026/0213593 A1 Jul. 23, 2026

(30) Foreign Application Priority Data

Mar. 29, 2022 (JP) ................................ 2022-053600

(51) Int. Cl.
*H02K 1/276* (2022.01)
*H02K 21/14* (2006.01)

(52) U.S. Cl.
CPC ............ *H02K 1/276* (2013.01); *H02K 21/14* (2013.01); *H02K 2213/03* (2013.01)

(58) Field of Classification Search
CPC .... H02K 1/276; H02K 21/14; H02K 2213/03; H02K 1/27; H02K 1/2766; H02K 1/2706
(Continued)

(56) References Cited

U.S. PATENT DOCUMENTS

2010/0026128 A1 2/2010 Ionel
2015/0145371 A1 5/2015 Kim et al.
(Continued)

FOREIGN PATENT DOCUMENTS

JP 2018-198534 A 12/2018

*Primary Examiner* — Alexander A Singh
(74) *Attorney, Agent, or Firm* — Birch, Stewart, Kolasch & Birch, LLP

(57) ABSTRACT

When a front reference location (Pf) is an intersection point of a front imaginary line (L1) passing through a center axis (O) of a rotor core (31) and a front end of each set of permanent magnets (32) and an outer circumferential surface of the rotor core (31) in a plane view, and a rear reference location (Pr) is an intersection point of a rear imaginary line (L2) passing through the center axis (O) of the rotor core (31) and a rear end of each set of the permanent magnets (32) and the outer circumferential surface of the rotor core (31) in the plane view, a rear end (39) of a front bridge (**39*f*) is disposed at a position away from the front reference location (Pf) to a rear (R) by θa/24 (radian) or more and θa/8 (radian) or less at a central angle about the center axis (O), and a front end (39*rl*) of a rear bridge (39*r***) is disposed at a position away from the rear reference location (Pr) to a front (F) by 0 (radian) or more and θa/12 (radian) or less at the central angle about the center axis (O). However, Oa satisfies Formula (1) described below.

$$\theta a = 2\pi/(Nslot) \quad (1)$$

4 Claims, 5 Drawing Sheets

(58) Field of Classification Search
USPC ........................................ 310/156.56, 156.83
See application file for complete search history.

(56) References Cited

U.S. PATENT DOCUMENTS

| | | | | |
|---|---|---|---|---|
| 2017/0133960 | A1* | 5/2017 | Takahashi ............. | H02P 25/022 |
| 2020/0328638 | A1 | 10/2020 | Hu et al. | |
| 2022/0069646 | A1 | 3/2022 | Tang et al. | |

* cited by examiner

ROTARY ELECTRIC MACHINE

TECHNICAL FIELD OF THE INVENTION

The present invention relates to a rotary electric machine.

The present application claims priority based on Japanese Patent Application No. 2022-053600 filed in Japan on Mar. 29, 2022, the contents of which are incorporated herein by reference.

RELATED ART

Conventionally, for example, a rotary electric machine described in Patent Document 1 below is known.

CITATION LIST

Patent Document

[Patent Document 1]

Japanese Unexamined Patent Application, First Publication No. 2018-198534

SUMMARY OF INVENTION

Problems to be Solved by the Invention

The inventor of the present application has found that there is room for improvement in improvement of torque in this type of interior permanent magnet synchronous motor (IPMSM).

The present invention has been made in view of the above circumstances, and an object is to improve torque.

Means for Solving the Problem

<1> A rotary electric machine according to an aspect of the present invention is a rotary electric machine including: a stator having an annular shape; and a rotor that is disposed in the stator, in which the rotor includes: a rotor core; and a plurality of sets of permanent magnets embedded in the rotor core, each set of the permanent magnets constituting one magnetic pole, the plurality of sets of the permanent magnets disposed in the rotor core in a circumferential direction of the rotor core, the rotor core includes: a first flux barrier provided on both sides in a rotation direction of the rotor with respect to each set of the permanent magnets; and a first bridge provided outside the rotor core in a radial direction with respect to the first flux barrier, and the first bridge includes: a front bridge provided at a front in the rotation direction of the rotor; and a rear bridge provided at a rear in the rotation direction of the rotor, and in which when a front reference location that is a reference location of the front bridge is an intersection point of a front imaginary line passing through a center axis of the rotor core and a front end of each set of the permanent magnets and an outer circumferential surface of the rotor core in a plane view in which the rotor is viewed from an axial direction, and a rear reference location that is a reference location of the rear bridge is an intersection point of a rear imaginary line passing through the center axis of the rotor core and a rear end of each set of the permanent magnets and the outer circumferential surface of the rotor core in the plane view, in at least one set of the permanent magnets among the plurality of sets of the permanent magnets, a rear end of the front bridge is disposed at a position away from the front reference location to the rear by θa/24 (radian) or more and θa/8 (radian) or less at a central angle about the center axis, and a front end of the rear bridge is disposed at a position away from the rear reference location to the front by 0 (radian) or more and θa/12 (radian) or less at the central angle about the center axis.

θa satisfies Formula (1) described below, $$\theta a=2\pi/(\mathrm{Nslot}) \quad (1)$$

Here, Nslot in Formula (1) described above means the number of slots of the stator. In addition, one set of permanent magnets includes one or more permanent magnets. Further, the rear end of the front bridge and the front end of the rear bridge are portions of the bridges where magnetic saturation of the magnetic flux generated by each set of permanent magnets occurs. In other words, the rear end of the front bridge and the front end of the rear bridge are portions of the bridges where the magnetic flux starts to cross from the rotor to the stator.

<2> The rotary electric machine according to <1> may adopt a constitution in which in the at least one of the plurality of sets of the permanent magnets, the rear end of the front bridge is disposed at a position away from the front reference location to the rear by θa/12 (radian) at the central angle about the center axis, and the front end of the rear bridge is disposed at the rear reference location.

<3> The rotary electric machine according to <1> or <2> may adopt a constitution in which two permanent magnets form a set to constitute one magnetic pole, each set of the permanent magnets includes a front magnet positioned at the front and a rear magnet positioned at the rear, the front magnet and the rear magnet are disposed in a V shape protruding inward in the radial direction in the plane view, the front bridge is provided in front of the front magnet, the rear bridge is provided in the rear of the rear magnet, and in the plane view, the front imaginary line passes through the center axis and a front end of the front magnet, and the rear imaginary line passes through the center axis and a rear end of the rear magnet.

The inventor of the present application has found that the circumferential position of the rear end of the front bridge and the circumferential position of the front end of the rear bridge, in other words, the start position of the first bridge affects the torque. In particular, the inventor of the present application has found that the torque increases when the circumferential position of the rear end of the front bridge is disposed at the rear in the rotation direction with respect to the front reference location.

This phenomenon is considered to be based on the principle described below.

That is, magnetic saturation occurs at the start position of the first bridge in the process of transmitting the magnetic flux generated in the magnetic pole constituted by one set of permanent magnets in the rotor core. Then, the magnetic flux flows from the inside to the outside of the rotor core and is transmitted to the teeth of the stator. Therefore, the start position of the first bridge is a starting point at which the magnetic flux is transmitted to the stator. Here, as the rear end of the front bridge is positioned at the rear in the rotation direction with respect to the front reference location, the orientation (direction) of the magnetic flux line transmitted from the front bridge to the teeth of the stator is inclined with respect to the radial direction of the rotor, in other words, the longitudinal direction of the teeth, and as a result, the magnetic flux line becomes longer. At this time, it is considered that a force is generated so that the magnetic flux line becomes short, and the torque increases as a result of the rotation of the rotor by the force. Based on the above findings, the inventor of the present application intensively studied the circumferential position of the rear end of the front bridge and the circumferential position of the front end of the rear bridge in units of θa (radian) at the central angle corresponding to the pitch of the teeth of the stator, and found that by setting as described above, high torque can be output.

Note that the disposition and shapes of the two first flux barriers and the disposition and shapes of the two first bridges constituting one magnetic pole are generally symmetrical in many cases, and in this type of rotary electric machine, rotary electric machines in which the disposition and shapes of the two first bridges are asymmetrically changed are not generally seen.

Effects of the Invention

According to the present invention, it is possible to improve the torque.

BRIEF DESCRIPTION OF THE DRAWING(S)

EMBODIMENT(S) OF THE INVENTION

Hereinafter, a rotary electric machine according to an embodiment of the present invention will be described with reference to FIGS. 1 to 8. The rotary electric machine is an electric motor, specifically, an AC electric motor, more specifically, a synchronous electric motor, and still more specifically, a permanent magnet field type electric motor. This type of electric motor is suitably adopted in, for example, an electric vehicle.

Figure 1:
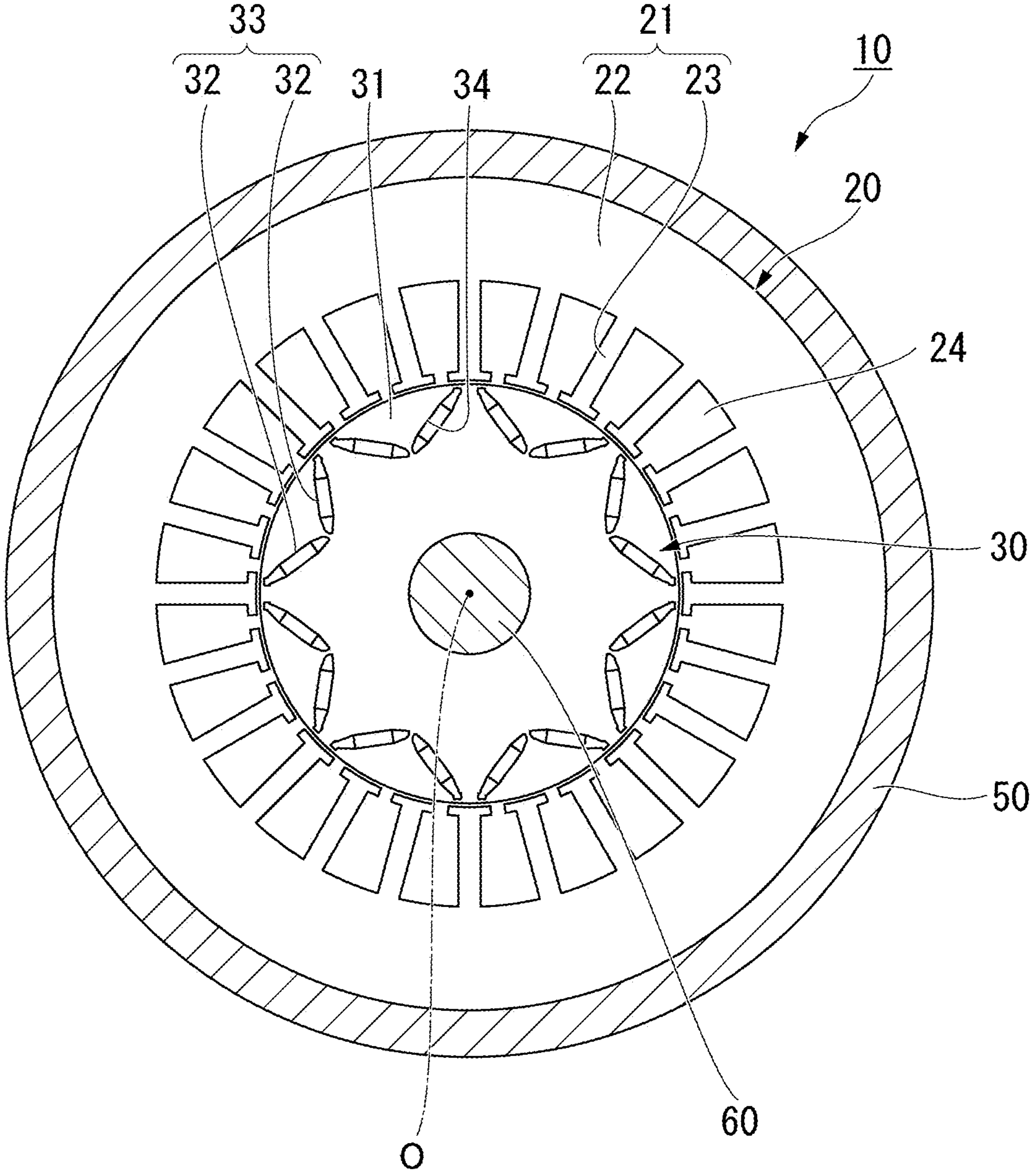
FIG. 1 is a diagram illustrating a rotary electric machine according to an embodiment of the present invention, and is a plan diagram including a partial cross section.
Figure 2:
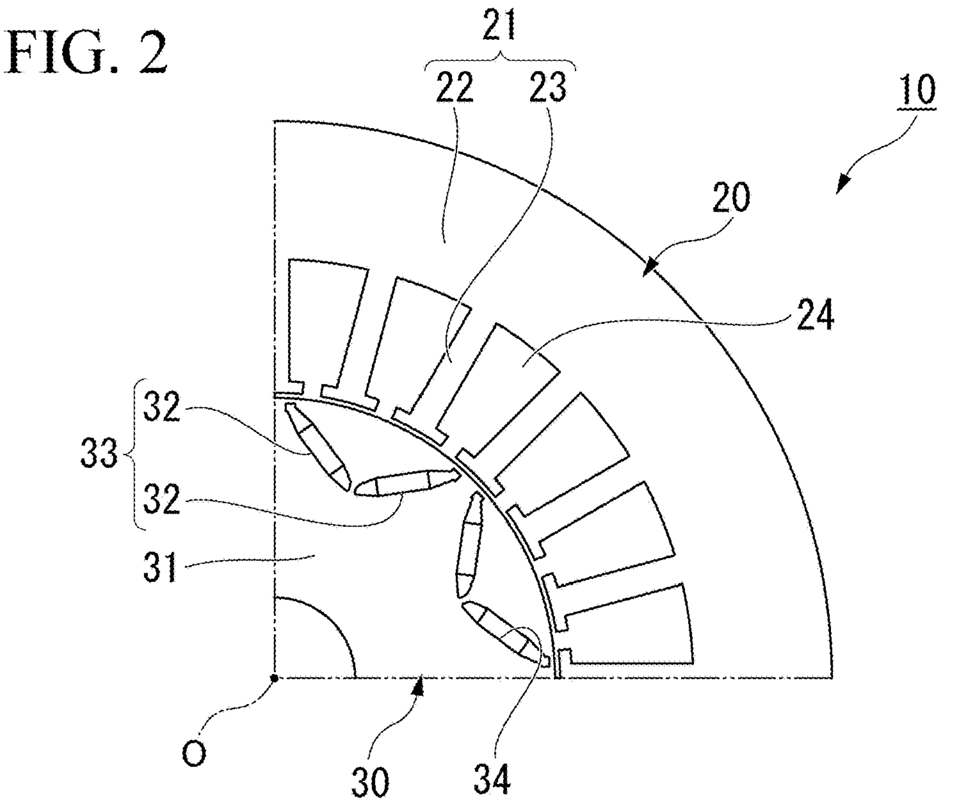
FIG. 2 is an enlarged plan diagram of a stator and a rotor included in the rotary electric machine illustrated in FIG. 1.

As illustrated in FIGS. 1 and 2, a rotary electric machine 10 includes a stator 20, a rotor 30, a case 50, and a rotary shaft 60. The stator 20 and the rotor 30 are housed in the case 50. The stator 20 is fixed to the case 50. The rotary electric machine 10 is of an inner rotor type in which the rotor 30 is positioned inside the stator 20.

Note that, in the present embodiment, the rotary electric machine 10 is a three-phase AC motor having 8 poles and 24 slots. However, for example, the number of poles, the number of slots, the number of phases, and the like can be appropriately changed.

In addition, in the rotary electric machine 10, the axes of the stator 20 and the rotor 30 are on a common axis. Hereinafter, this common axis is referred to as a central axis O (center axis of the rotor 30). A direction of the central axis O (an axial direction of a rotor core 31 to be described below) is referred to as an axial direction, a direction orthogonal to the central axis O (a radial direction of the rotor core 31 to be described below) is referred to as a radial direction, and a direction circling around the central axis O (a circumferential direction of the rotor core 31 to be described below) is referred to as a circumferential direction.

The stator 20 includes a stator core 21 and a winding, which is not illustrated.

The stator core 21 includes a core back 22 (yoke) having a cylindrical shape (circular shape) and a plurality of teeth 23.

The core back 22 is formed in an annular shape in a plane view in which the rotary electric machine 10 is viewed from the axial direction.

The plurality of teeth 23 protrude inward in the radial direction from the core back 22 (toward the central axis O of the core back 22 along the radial direction). The plurality of teeth 23 is disposed at equal intervals in the circumferential direction. In the present embodiment, 24 teeth 23 are provided every 15 degrees of the central angle about the central axis O. The plurality of teeth 23 are formed in the same shape and the same size. A slot 24 is formed between the teeth 23 adjacent in the circumferential direction.

The winding is wound around the teeth 23. The winding may be wound in a concentric manner or may be wound in a distributed manner.

Figure 3:
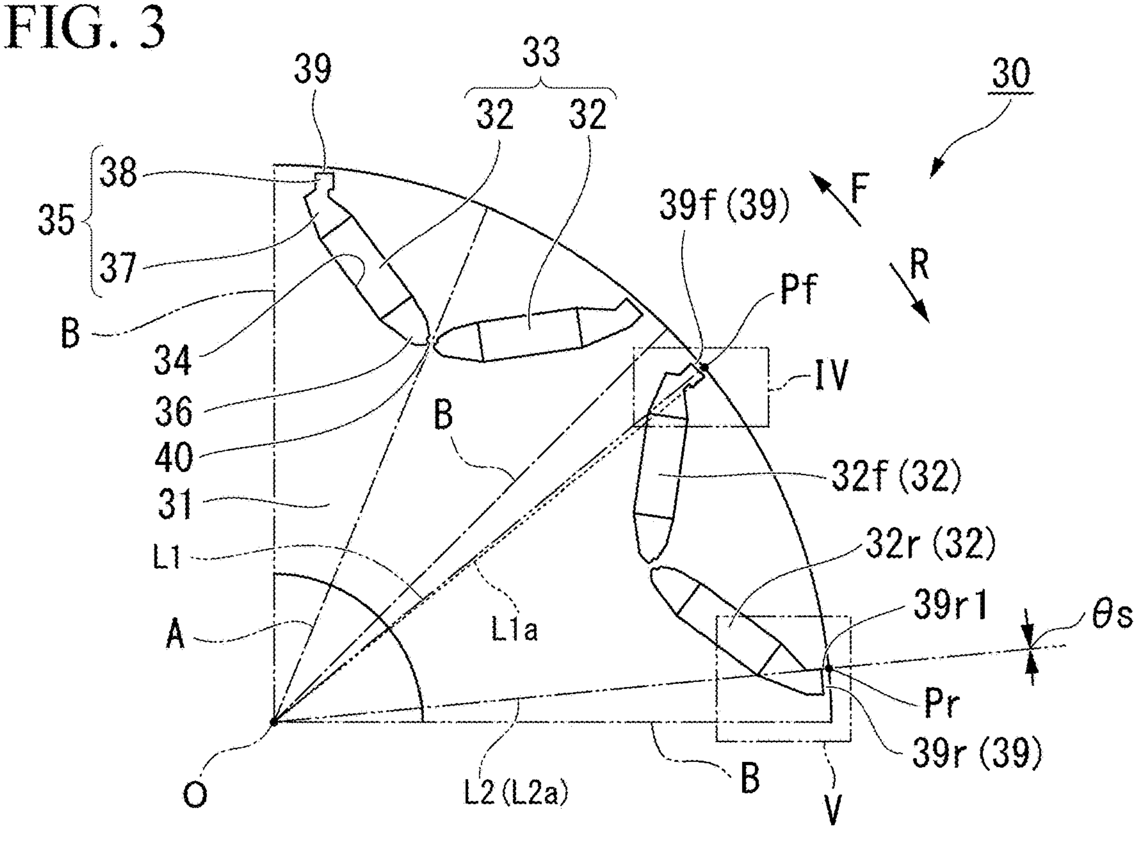
FIG. 3 is an enlarged plan diagram of the rotor included in the rotary electric machine illustrated in FIG. 1.

As illustrated in FIG. 3, the rotor 30 is disposed inside the stator 20 (stator core 21) in the radial direction. The rotor 30 includes the rotor core 31 and a plurality of permanent magnets 32.

The rotor core 31 is formed in a cylindrical shape (circular shape) disposed coaxially with the stator 20. The rotary shaft 60 is disposed in the rotor core 31. The rotary shaft 60 is fixed to the rotor core 31 so as to rotate together with the rotor core 31.

The plurality of permanent magnets 32 is fixed to the rotor core 31. In the present embodiment, one set of two permanent magnets 32 forms one magnetic pole 33. The plurality of pairs of permanent magnets 32 are disposed at equal intervals in the circumferential direction. In the present embodiment, 8 sets of (16 in total) permanent magnets 32 are provided every 45 degrees of the central angle about the central axis O.

The rotary electric machine 10 is an interior magnet motor. A plurality of through-holes 34 penetrating the rotor core 31 in the axial direction is formed in the rotor core 31. The plurality of through-holes 34 is provided corresponding to the plurality of permanent magnets 32. Each of the permanent magnets 32 is fixed to the rotor core 31 in a state of being disposed in the corresponding through-hole 34. Each of the permanent magnets 32 can be fixed to the rotor core 31, for example, by bonding an outer surface of the permanent magnet 32 to an inner surface of the through-hole 34 with an adhesive.

Note that a laminated core can be adopted as the stator core 21 and the rotor core 31. The laminated core is formed by laminating a plurality of electrical steel sheets. The laminated electrical steel sheets are fixed to each other by, for example, wedging, adhesion, welding, or the like.

Each of the electrical steel sheets forming the stator core 21 and the rotor core 31 is formed by, for example, punching an electrical steel sheet serving as a base metal. As the electrical steel sheet, a known electrical steel sheet can be used. A chemical composition of the electrical steel sheet is not particularly limited. In the present embodiment, a non-oriented electrical steel sheet is adopted as the electrical steel sheet. As the non-oriented electrical steel sheet, a non-oriented electrical steel strip of JIS C 2552:2014 can be adopted. However, as the electrical steel sheet, a grain-oriented electrical steel sheet can be adopted instead of the non-oriented electrical steel sheet. As the grain-oriented electrical steel sheet, an oriented electrical steel strip of JIS C 2553:2012 can be adopted.

Insulating coatings are provided on both surfaces of the electrical steel sheet in order to improve workability of the electrical steel sheet and iron loss of the laminated core. As a substance constituting the insulating coating, for example, (1) an inorganic compound, (2) an organic resin, and (3) a mixture of an inorganic compound and an organic resin can be applied. Examples of the inorganic compound include (1) a complex of a dichromate and boric acid, and (2) a complex of a phosphate and silica. Examples of the organic resin include an epoxy-based resin, an acrylic resin, an acrylic styrene-based resin, a polyester-based resin, a silicon-based resin, and a fluorine-based resin.

Details of the rotor 30 will be described below.

As illustrated in FIG. 3, the permanent magnets 32 are embedded in the rotor core 31 and the two form a pair to constitute one magnetic pole 33 as described above. A plurality of pairs (8 pairs in the illustrated example) of permanent magnets 32 are disposed in the rotor core 31 in the circumferential direction. In the illustrated example, the permanent magnet 32 has a rectangular parallelepiped shape. The permanent magnet 32 has a rectangular shape in plane view.

The pair of permanent magnets 32 is disposed in a V shape protruding inward in the radial direction in the plane view. The pair of permanent magnets 32 is disposed line-symmetrically with respect to a d axis A in the plane view. The d axis A passes through the central axis O and the circumferential center of each magnetic pole 33 in the plane view. The through-holes 34 in which the pair of permanent magnets 32 are disposed are also disposed generally line-symmetrically with respect to the d axis A.

The through-hole 34 is larger than the permanent magnet 32 on both sides: a q axis B side and the d axis A side in the plane view. The q axis B passes through the central axis O and between two magnetic poles 33 adjacent in the circumferential direction in the plane view. The q axis B passes through a circumferential center between the two magnetic poles 33 in the plane view. The q axis B and the d axis A are magnetically and electrically orthogonal to each other. Portions of the through-hole 34 positioned on the q axis B side and the d axis A side with respect to the permanent magnet 32 are flux barriers 35 and 36, respectively. In other words, the flux barriers 35 and 36 are provided at both ends of the permanent magnets 32 on the q axis B side and the d axis A side. The flux barriers 35 and 36 are magnetic voids penetrating the rotor core 31 in the axial direction. The flux barriers 35 and 36 reduce the magnet magnetic flux (hereinafter, also referred to as a reflux magnetic flux) from the permanent magnet 32 refluxing in the rotor 30, and change an inflow path of the magnet magnetic flux from the permanent magnet 32 to the stator 20. As a result, the magnet magnetic flux of the permanent magnet 32 (hereinafter, simply the magnet magnetic flux) is effectively transmitted to the stator 20, and high torque is output. It can also be said that the flux barriers 35 and 36 guide the magnet magnetic flux to the stator 20.

The rotor 30 includes a first flux barrier 35 and a second flux barrier 36 as the flux barriers 35 and 36. The first flux barrier 35 and the second flux barrier 36 sandwich the permanent magnet 32 from both ends. This facilitates effective transmission of the magnet magnetic flux to the stator 20.

The first flux barrier 35 is positioned on the q axis B side closest to one permanent magnet 32. The first flux barriers 35 are positioned on both outer sides of the pair of permanent magnets 32 in the circumferential direction (rotation direction). The second flux barrier 36 is positioned on the d axis A side closest to one permanent magnet 32. It is positioned at the center in the circumferential direction (rotation direction) of the pair of permanent magnets 32.

The first flux barrier 35 extends radially outward the rotor core 31 from the end surface on the q axis B side closest to one permanent magnet 32. The first flux barrier 35 includes a first space 37 and a second space 38. In the first space 37, the end surface on the q axis B side closest to one permanent magnet 32 is exposed. The first space 37 extends to the q axis B side closest to one permanent magnet 32 in the plane view. The first space 37 has a triangular shape protruding toward the q axis B side in the plane view. The space width of the first space 37 in the radial direction decreases to the q axis B side closest to one permanent magnet 32. The second space 38 communicates with the first space 37. At least a part of the second space 38 is positioned radially outside the first space 37. In the plane view, the second space 38 has a rectangular shape. In the plane view, the area of the second space 38 is smaller than the area of the first space 37.

A first bridge 39 is provided radially outside the first flux barrier 35. The first bridge 39 is a part of the rotor core 31. The first bridge 39 is a portion of the rotor core 31 that is positioned radially outside the first flux barrier 35. With the presence of the first bridge 39, centrifugal resistance of the rotor core 31 is improved as compared with the case where the first bridge 39 is absent. The first bridge 39 ensures dynamic strength on the outer periphery of the rotor core 31. When the radial width of the first bridge 39 is sufficiently narrow, the magnetic flux passing through the first bridge 39 is prevented by magnetic saturation, and the reflux of the magnet magnetic flux is prevented.

The width (size in the radial direction) of the first bridge 39 is locally smaller than the width of both portions of the rotor core 31 adjacent to the first bridge 39 in the circumferential direction.

Note that the length (size in the circumferential direction) and width of the first bridge 39 are appropriately designed according to the rotation speed and the shape of the rotary electric machine 10. For example, the width of the first bridge 39 is smaller than the width of both portions of the rotor core 31 adjacent to the first bridge 39 in the circumferential direction, but may not be locally smaller. For example, the width of the first bridge 39 may be continuously smaller than the width of both portions of the rotor core 31 adjacent to the first bridge 39 in the circumferential direction. In this case, for example, in the outer circumferential portion of the rotor core 31, a portion in which the radial size (width) is 1% or less of the outer diameter of the rotor core 31 may be the first bridge 39. In addition, the shape, the size, and the like of the first flux barrier 35 are not limited to the aspects described in the present embodiment.

The second flux barrier 36 includes a first space 37 in which the end surface on the d axis A side closest to one permanent magnet 32 is exposed. The first space 37 extends to the d axis A side closest to one permanent magnet 32 in the plane view. A second bridge 40 is provided between the two second flux barriers 36 forming a pair in each magnetic pole 33. The second bridge 40 is longer in the radial direction than in the circumferential direction. The second bridge 40 causes magnetic flux saturation in the second bridge 40 and inhibits formation of a magnetic circuit. The second bridge 40 is positioned on the d axis A.

Hereinafter, the front in the rotation direction (circumferential direction) of the rotary electric machine 10 is simply referred to as front F, and the rear in the rotation direction is simply referred to as rear R. Note that, in the case of the rotary electric machine 10 rotatable in both directions about the central axis O, the rotation direction means a rotation direction in which the rotary electric machine 10 mainly rotates. In addition, in the illustrated example, the counter-clockwise direction when the paper surface is viewed is referred to as the front F, and the clockwise direction is referred to as the rear R.

The pair of permanent magnets 32 includes a front magnet 32*f* and a rear magnet 32*r*. The front magnet 32*f* is positioned on the front F side with respect to the rear magnet 32*r*.

The two first bridges 39 included in one magnetic pole 33 include a front bridge 39*f* and a rear bridge 39*r*. The front bridge 39*f* is provided with respect to the front magnet 32*f*. The front bridge 39*f* is positioned on the front F side (q axis B side) and radially outside with respect to the front magnet 32*f*. The front bridge 39*f* is positioned radially outside the first flux barrier 35 located on the front F side among the pair of first flux barriers 35. The rear bridge 39*r* is provided with respect to the rear magnet 32*r*. The rear bridge 39*r* is positioned on the rear R side (q axis B side) and radially outside with respect to the rear magnet 32*r*. The rear bridge 39*r* is positioned radially outside the first flux barrier 35 positioned on the rear R side among the pair of first flux barriers 35.

A reference location with respect to the front bridge 39*f* is defined as a front reference location Pf, and a reference location with respect to the rear bridge 39*r* is defined as a rear reference location Pr as described below. The front reference location Pf is an intersection point of a front imaginary line L1 passing through the central axis O and a circumferential front end of the front magnet 32*f* on the front F side and the outer circumferential surface of the rotor core 31 in the plane view. The rear reference location Pris an intersection point of a rear imaginary line L2 passing through the central axis O and a circumferential rear end of the rear magnet 32*r* on the rear R side and the outer circumferential surface of the rotor core 31 in the plane view.

Figure 4:
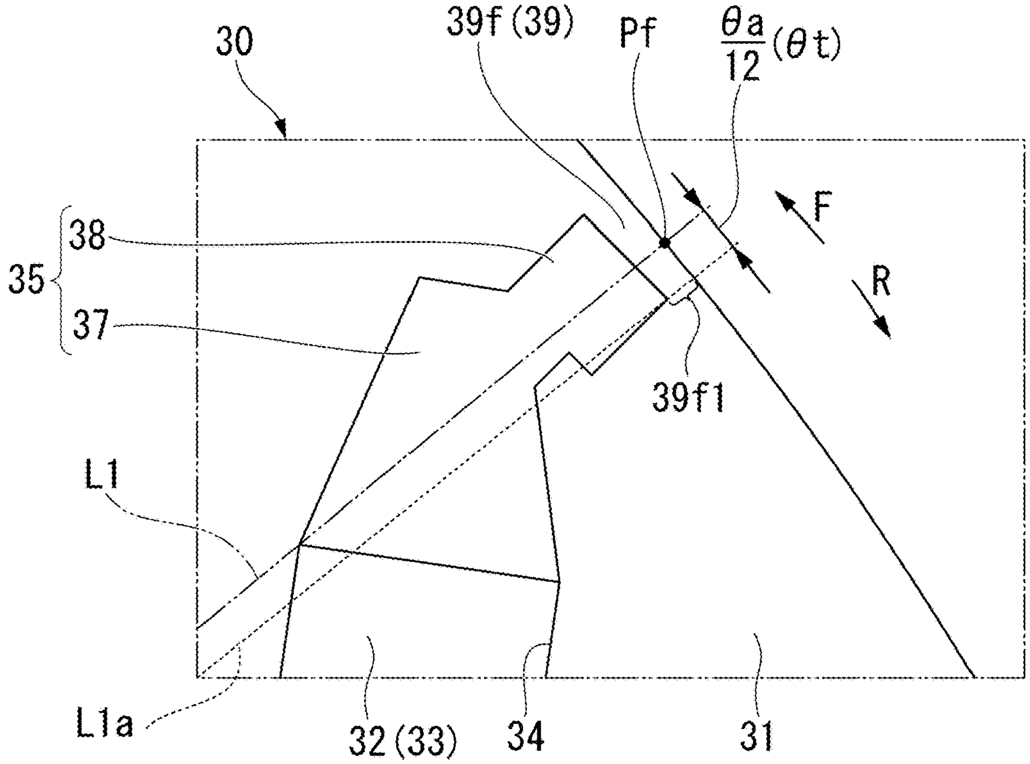
FIG. 4 is an enlarged plan diagram of a portion IV illustrated in FIG. 3.

Then, in the present embodiment, as illustrated in FIGS. 3 and 4, a rear end 39*fl* of the front bridge 39*f* positioned on the most rear R side is disposed at a position away from the front reference location Pf toward the rear R side by θa/24 (radian) or more and θa/8 (radian) or less at the central angle about the central axis O. A front end 39*rl* of the rear bridge 39*r* positioned on the most front F side is disposed at a position away from the rear reference location Pr toward the front F side by 0 (radian) or more and θa/12 (radian) or less at the central angle about the central axis O.

However, Oa satisfies Formula (1) described below.

$$\theta a = 2\pi/(\text{Nslot}) \quad (1)$$

where Nslot in Formula (1) described above means the number of slots of the stator 20.

The rear end 39*fl* of the front bridge 39*f* positioned on the most rear R side is preferably disposed at a position away from the front reference location Pf toward the rear R side by 3θa/48 (radian) or more and 5θa/48 (radian) or less at the central angle about the central axis O.

The front end 39*rl* of the rear bridge 39*r* positioned on the most front F side is preferably disposed at a position away from the rear reference location Pf toward the front F side by 0 (radian) or more and θa/48 (radian) or less at the central angle about the central axis O.

Figure 5:
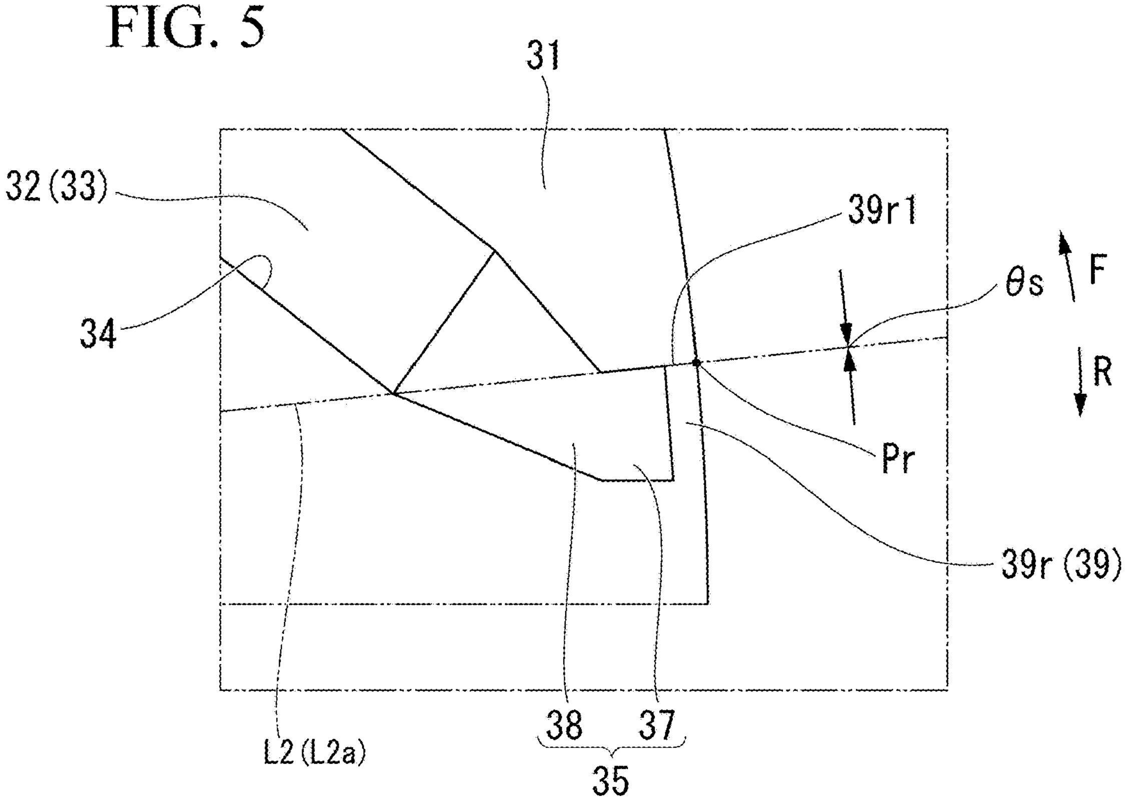
FIG. 5 is an enlarged plan diagram of a portion V illustrated in FIG. 3.
Figure 6:
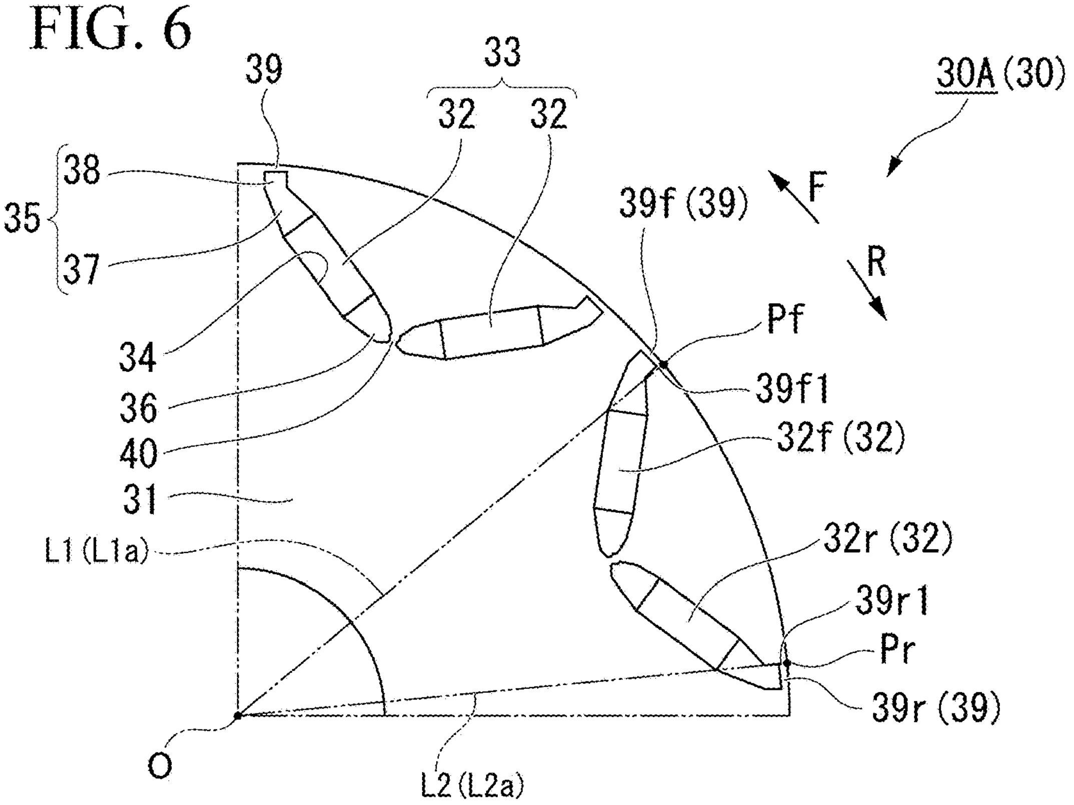
FIG. 6 is a diagram showing the rotary electric machine illustrated in FIG. 1, and is an enlarged plan diagram illustrating a state in which a rear end of a front bridge and a front end of a rear bridge of the rotor are positioned at respective reference locations.
Figure 7:
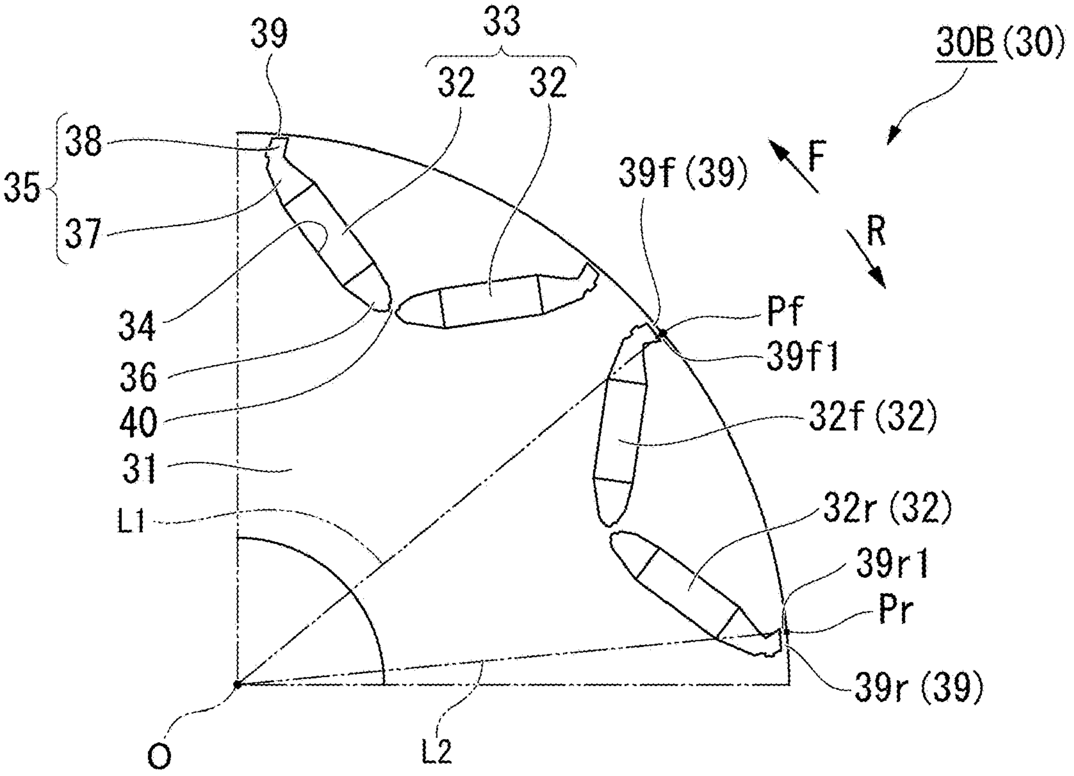
FIG. 7 is a diagram showing the rotary electric machine illustrated in FIG. 1, and is an enlarged plan diagram illustrating a state in which the rear end of the front bridge of the rotor is moved to the rear as compared with the position illustrated in FIG. 5 and the front end of the rear bridge is moved to the front as compared with the position illustrated in FIG. 5.

Further, in the present embodiment, as illustrated in FIG. 4, the rear end 39*fl* of the front bridge 39*f* is disposed at a position away from the front reference location Pf toward the rear R side by θa/12 (radian) at the central angle about the central axis O. As illustrated in FIG. 5, the front end 39*rl* of the rear bridge 39*r* is disposed at the rear reference location Pr.

Here, the rear end 39*fl* of the front bridge 39*f* and the front end 39*rl* of the rear bridge 39*r* are portions of the bridges 39 where magnetic saturation of the magnetic flux generated by each set of permanent magnets 32 occurs. In other words, the rear end 39*fl* of the front bridge 39*f* and the front end 39*rl* of the rear bridge 39*r* are portions of the bridges 39 where the magnetic flux starts to cross from the rotor 30 to the stator 20. The rear end 39*fl* of the front bridge 39*f* and the front end 39*rl* of the rear bridge 39*r* are magnetic saturation start positions of each bridge 39. The magnetic saturation start position in the front bridge 39*f* is a circumferential end portion position on the rear R side of the magnetic saturation start position of the rear end 39*fl*. The magnetic saturation start position in the rear bridge 39*r* is a circumferential end portion position on the front F side of the magnetic saturation start position of the front end 39*rl*. The magnetic saturation start position is a position where the distance between the front bridge 39*f* and the rear bridge 39*r* and the outer circumferential surface of the rotor core 31 is the shortest. The magnetic saturation start position of the bridge 39 may be obtained as a position where the absolute value of the magnetic flux density obtained by, for example, electromagnetic field analysis exceeds the saturation magnetic flux density of a magnetic material used for the rotor core. Instead of the electromagnetic field analysis, an experiment using an actual object may be adopted. The magnetic saturation start position can be specified by any one or more methods described above.

The rear end 39*fl* of the front bridge 39*f* and the front end 39*rl* of the rear bridge 39*r* is a boundary of the first bridge 39 with respect to a portion other than the first bridge 39. The rear end 39*fl* of the front bridge 39*f* and the front end 39*rl* of the rear bridge 39*r* are defined as regions connecting the first flux barrier 35 of the rotor core 31 and the outer circumferential surface of the rotor core 31 with the shortest distance in the radial direction. The front end 39*rl* of the rear bridge 39*r* and the rear end 39*fl* of the front bridge 39*f* are partial regions on an imaginary line passing through the first flux barrier 35 and the central axis O.

Figure 8:
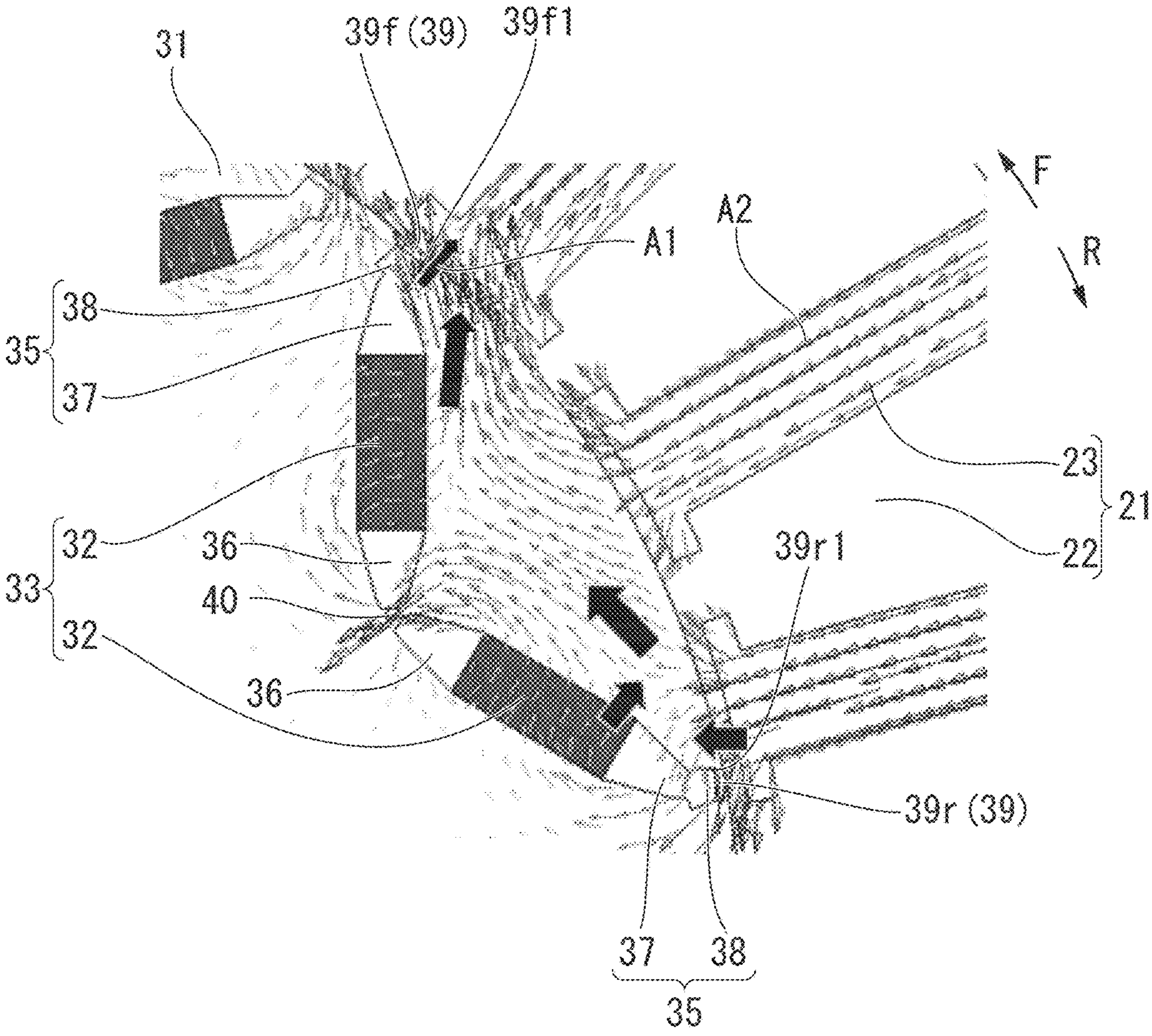
FIG. 8 is a diagram illustrating an image in which a magnetic flux flows in the rotary electric machine according to an embodiment of the present invention.

FIG. 8 illustrates an image in which a magnetic flux flows in the rotary electric machine according to the present embodiment. Arrows A1 and A2 in FIG. 8 mean a flow of magnetic flux. The arrow A1 indicates a rough flow of the magnetic flux. The arrow A2 indicates a magnetic flux density vector at each position. As illustrated in FIG. 8, in the front bridge 39*f*, the magnetic flux passes through the stator 20 at the rear end 39*fl* of the front bridge 39*f*. In the rear bridge 39*r*, the amount of magnetic flux entering the magnetic pole 33 side changes depending on the position of the front end 39*rl* of the rear bridge 39*r*.

For example, when the width (size in the radial direction) at the end of the rear R in the portion (hereinafter, referred to as a first portion) of the rotor core 31 radially sandwiched between the first flux barrier 35 on the front F side and the outer circumferential surface of the rotor core 31 is sufficiently narrow, the rear end 39*fl* of the front bridge 39*f* can be an end of the rear R. In this case, the first portion becomes the front bridge 39*f* over the total length (length in the circumferential direction) of the first flux barrier 35. In this case, on the front F side of the rear end 39*fl* of the front bridge 39*f*, the width of the front bridge 39*f* may be narrower or wider than the rear end 39*fl*. In other words, when the rear end 39*fl* of the front bridge 39*f* is the magnetic saturation start position, the portion of the front bridge 39*f* positioned at the front with respect to the rear end 39*fl* may be larger or smaller than the rear end 39*fl* in the radial direction.

In addition, when the width of the end on the front F side in the portion (hereinafter, referred to as a second portion) of the rotor core 31 radially sandwiched between the first flux barrier 35 on the rear R side and the outer circumferential surface of the rotor core 31 is sufficiently narrow, the front end 39*rl* of the rear bridge 39*r* can be an end on the front Fend. In this case, the second portion becomes the rear bridge 39*r* over the total length (length in the circumferential direction) of the first flux barrier 35. In this case, on the rear R side of the front end 39*rl* of the rear bridge 39*r*, the width of the rear bridge 39*r* may be narrower or wider than the front end 39*rl*.

Further, for example, when the width of the end of the first portion on the rear R side is not sufficiently narrow, the rear end 39*fl* of the front bridge 39*f* can be a region positioned on the most rear R side within the region where the width of the first portion is sufficiently narrow. In this case, a part of the first portion serves as the front bridge 39*f*, and the rear end 39*fl* of the front bridge 39*f* is positioned on the front F side with respect to the end of the first portion on the rear R side in the circumferential direction.

In addition, when the width of the end of the second portion on the front F side is not sufficiently narrow, the front end 39*rl* of the rear bridge 39*r* can be a region positioned on the most front F side within the region where the width of the second portion is sufficiently narrow. In this case, a part of the second portion serves as the front bridge 39*f*, and the front end 39*rl* of the rear bridge 39*r* is positioned on the rear R side with respect to the end of the second portion on the front F side in the circumferential direction.

Note that, in any of the above cases, the fact that the widths of the first portion and the second portion are sufficiently narrow may mean that, for example, the width is 1% or less of the outer diameter of the rotor core 31. In addition, the fact that the widths of the first portion and the second portion are sufficiently narrow may mean that the width is, for example, 0.3 mm or less. In addition, in order to specify the rear end 39*fl* of the front bridge 39*f* and the front end 39*rl* of the rear bridge 39*r*, the rotary electric machine 10 may be reproduced on software and electromagnetic field analysis may be performed.

Here, the central angle with respect to the rear end 39*fl* of the front bridge 39*f* and the front reference location Pf is the central angle about the central axis O with respect to an imaginary line L1*a* related to the front bridge 39*f* and the front imaginary line L1. The imaginary line L1*a* is an imaginary line passing through the rear end 39*fl* of the front bridge 39*f* and the central axis O. Note that when the angle between the front imaginary line L1 and the imaginary line L1*a* is θt, (θa/24)≤θt≤(θa/8) holds, and in the present embodiment, θt=(θa/12) holds.

In addition, the central angle with respect to the front end 39*rl* of the rear bridge 39*r* and the rear reference location Pris the central angle about the central axis O with respect to an imaginary line L2*a* related to the rear bridge 39*r* and the rear imaginary line L2. The imaginary line L2*a* is an imaginary line passing through the front end 39*rl* of the rear bridge 39*r* and the central axis O. In addition, the fact that the central angle with respect to the front end 39*rl* of the rear bridge 39*r* and the rear reference location Pris 0 (radian), in other words, the front end 39*rl* of the rear bridge 39*r* is disposed at the rear reference location Pr means that the imaginary line L2*a* and the rear imaginary line L2 coincide with each other. Note that when the angle between the rear imaginary line L2 and the imaginary line L2*a* is θs, 0≤θs≤(θa/12) holds, and in the present embodiment, θs=0 holds.

The inventor of the present application has found that the circumferential position of the rear end 39*fl* of the front bridge 39*f* and the circumferential position of the front end 39*rl* of the rear bridge 39*r* (hereinafter, these positions are collectively referred to as the start position of the first bridge 39) affect the torque. In particular, the inventor of the present application has found that the torque increases when the circumferential position of the rear end 39*fl* of the front bridge 39*f* is disposed at the rear R of the front reference location Pf in the rotation direction.

This finding was obtained through the process described below.

The inventor of the present application analyzed shape optimization of the rotor core 31. This analysis is based on the contents described in Japanese Unexamined Patent Application, First Publication No. 2021-114099. The inventor of the present application performed the analysis a plurality of times on the premise of a plurality of different advance angles. It can be said that the shape of the rotor core 31 as a result of each analysis is an optimum shape according to the advance angles serving as the premise. The inventor of the present application analyzed the result (shape) for the highest torque among the results of analyzing the optimum shapes for a plurality of types of advance angles. Note that the advance angle at this time was 50 degrees.

In the rotor core 31 according to this result, the rear end 39*fl* of the front bridge 39*f* is moved to the rear R side with respect to the front reference location Pf, and the front end 39*rl* of the rear bridge 39*r* is moved to the front F side with respect to the rear reference location Pr.

Therefore, it is considered that the torque can be improved by changing the position of the front bridge 39*f* in the circumferential direction with the same tendency as the optimum shape in which the torque is maximized in the analysis result.

Note that this phenomenon is considered to be based on the principle described below.

That is, magnetic saturation occurs at the start position of the first bridge 39 in the process of transmitting the magnetic flux generated in the magnetic pole 33 constituted by one pair of permanent magnets 32 in the rotor core 31. Then, the magnetic flux flows from the inside to the outside of the rotor core 31 and is transmitted to the teeth of the stator 20. Therefore, the start position of the first bridge 39 is a starting point at which the magnetic flux is transmitted to the stator 20. Here, as the rear end 39*fl* of the front bridge 39*f* is positioned at the rear R in the rotation direction with respect to the front reference location Pf, the orientation (direction) of the magnetic flux line transmitted from the front bridge 39*f* to the teeth 23 of the stator 20 is inclined with respect to the radial direction of the rotor 30, in other words, the longitudinal direction of the teeth 23, and as a result, the magnetic flux line becomes longer. At this time, it is considered that a force is generated so that the magnetic flux line becomes short, and the torque increases as a result of the rotation of the rotor 30 by the force.

Based on the above findings, the inventor of the present application intensively studied the circumferential position of the rear end 39*fl* of the front bridge 39*f* and the circumferential position of the front end 39*rl* of the rear bridge 39*r* in units of Oa (radian) at the central angle corresponding to the pitch of the teeth of the stator 20, and found that by setting as described above, high torque can be output.

This finding was obtained through the process described below.

The inventor of the present application conducted a new analysis. A target rotary electric machine 10 is a rotary electric machine 10 including rotors 30, 30A, and 30B illustrated in FIGS. 3, 6, and 7. In the rotary electric machine 10, since the number of slots is 24 as described above, θa=15 degrees. In the rotary electric machine 10, the analysis was performed on the premise of the shape in which the position of the rear end 39*fl* of the front bridge 39*f* was moved to the rear R side by 0.625 degrees (that is, (θa/24) degrees), and the position of the front end 39*rl* of the rear bridge 39*r* was moved to the front F side by 0.625 degrees, and the value of torque was evaluated. Note that, in the rotor 30 illustrated in FIG. 3, the rear end 39*fl* of the front bridge 39*f* is moved to the rear R side by 1.25° with respect to the front reference location Pf, and the front end 39*rl* of the rear bridge 39*r* is positioned at the rear reference location Pr. In the rotor 30A illustrated in FIG. 6, the rear end 39*fl* of the front bridge 39*f* is positioned at the front reference location Pf, and the front end 39*rl* of the rear bridge 39*r* is positioned at the rear reference location Pr. In the rotor 30B illustrated in FIG. 7, the rear end 39*fl* of the front bridge 39*f* is moved to the rear R by 0.625° with respect to the front reference location Pf, and the front end 39*rl* of the rear bridge 39*r* is moved to the front F by 0.625° with respect to the rear reference location Pr. Note that, in FIG. 7, the imaginary lines L1*a* and L2*a* are omitted.

The analysis conditions are as indicated in Table 1. The analysis results are as indicated in Table 2. Note that, in Table 2, the results of both the front bridge 39*f* and the rear bridge 39*r* are normalized with the movement angle of 0 degrees as a reference of 100.

TABLE 1

| | |
|---|---|
| Current | 20 Apeak |
| Advance angle | 50° |
| Frequency | 50 Hz |
| Magnet residual magnetic flux density | 0.4 T |
| Rotor diameter | 27 mm |

TABLE 2

| | | | Rotation front bridge | | | |
|---|---|---|---|---|---|---|
| | | 0° | −0.625° | −1.25° | −1.875° | −2.5° |
| Rotation rear bridge | −0.625 | 99.9 | 99.5 | 100.0 | 99.4 | — |
| | 0° | 100.0 | 100.6 | 100.9 | 100.6 | 99.8 |
| | +0.625° | 99.9 | 100.6 | 100.6 | 100.6 | 99.9 |
| | +1.25° | 99.6 | 100.4 | 100.4 | 100.3 | 99.1 |
| | +1.875° | — | 99.2 | 99.2 | 99.3 | — |

As indicated by the thick frame (within hatching) in Table 2, it has been confirmed that the torque is improved as compared with that of the reference shape by moving the rear end 39*fl* of the front bridge 39*f* to the rear R side by 0.625 degrees of more and 1.875 degrees or less (that is, (θa/24) degrees or more and (θa/8) degrees or less) and moving the front end 39*rl* of the rear bridge 39*r* in a range of the front F side by 0 degrees or more and 1.25 degrees or less (that is, 0 degrees or more (θa/12) degrees or less). In addition, in a case where the rear end 39*fl* of the front bridge 39*f* is moved by 1.25 degrees (that is (θa/12) degrees or less) to the rear R side and the movement angle of the front end 39*rl* of the rear bridge 39*r* is 0 degrees, it has been confirmed that the torque is maximized.

Note that the movement angle was measured by a simulation model. Specifically, the measurement was performed from the coordinates of node points included in a bridge portion on the simulation model.

Note that the disposition and shapes of the two first flux barriers 35 and the disposition and shapes of the two first bridges 39 constituting one magnetic pole 33 are generally symmetrical in many cases, and in this type of rotary electric machine 10, rotary electric machines in which the disposition and shapes of the two first bridges 39 are asymmetrically changed are not generally seen.

Note that the technical scope of the present invention is not limited only to the above-described embodiment, and various modification can be made without departing from the gist of the present invention.

The shape of the stator 20 is not limited only to the forms described in the embodiment. Specifically, the dimensions of the outer diameter and the inner diameter of the stator core 21, the laminating thickness, the number of slots, a dimensional proportion between a circumferential direction and a radial direction of the teeth 23, a dimensional proportion between the tooth 23 and the core back 22 in the radial direction, and the like can be arbitrarily designed according to desired characteristics of the rotary electric machine 10.

The shape of the rotor 30 is not limited only to the forms described in the embodiment. Specifically, the dimensions of the outer diameter and the inner diameter of the rotor core 31, the laminating thickness, the number of poles, and the like can be arbitrarily designed according to desired characteristics of the rotary electric machine 10.

In the above embodiment, both the stator core 21 and the rotor core 31 are laminated cores, but may not be laminated cores.

There may be no second flux barrier 36.

In the above embodiment, one magnetic pole 33 includes two permanent magnets 32. However, the present invention is not limited thereto. For example, one magnetic pole 33 may include one permanent magnet 32, three permanent magnets 32, or four or more permanent magnets 32. As one set of permanent magnets 32, another form including one or more permanent magnets 32 is appropriately adopted.

For example, when one set of permanent magnets 32 is one permanent magnet 32, the one permanent magnet 32 may have a rectangular shape that is long in a direction orthogonal to the d axis A in the plane view.

For example, in a case where one set of permanent magnets 32 is three permanent magnets 32 and the three permanent magnets 32 are arranged in the circumferential direction, the disposition described below may be adopted. In this case, the permanent magnet 32 positioned at the center in the circumferential direction may have a rectangular shape that is long in the direction orthogonal to the d axis A in the plane view. Further, in this case, the two permanent magnets 32 located on both sides in the circumferential direction may extend radially outward from the d axis A side toward the q axis B side in the plane view.

Additionally, it is possible to appropriately replace the constituent elements in the embodiment with well-known constituent elements without departing from the gist of the present invention, and the above-described modification examples may be appropriately combined with each other.

FIELD OF INDUSTRIAL APPLICATION

According to the present invention, it is possible to improve the torque. Therefore, industrial applicability is large.

BRIEF DESCRIPTION OF THE REFERENCE SYMBOLS

10 Rotary electric machine
20 Stator
21 Stator core
22 Core back
23 Tooth
24 Slot
30 Rotor
30A Rotor
30B Rotor
31 Rotor core
32 Permanent magnet
32*f* Front magnet
32*r* Rear magnet
33 Magnetic pole
34 Through-hole
35 First flux barrier
36 Second flux barrier
37 First space
38 Second space
39 First bridge
39*f* Front bridge
39*fl* Rear end
39*r* Rear bridge
39*rl* Front end
40 Second bridge
45 Central angle
50 Case
60 Rotary shaft
F Front
L1 Front imaginary line
L1*a* Imaginary line
L2 Rear imaginary line
L2*a* Imaginary line
O Central axis (center axis)
Pf Front reference location
Pr Rear reference location
R Rear

What is claimed is:

1. A rotary electric machine comprising:
a stator having an annular shape; and
a rotor that is disposed in the stator,
wherein
the rotor includes:
a rotor core; and
a plurality of sets of permanent magnets embedded in the rotor core, each set of the permanent magnets constituting one magnetic pole, the plurality of sets of the permanent magnets disposed in the rotor core in a circumferential direction of the rotor core,
the rotor core includes:
a first flux barrier provided on both sides in a rotation direction of the rotor with respect to each set of the permanent magnets; and
a first bridge provided outside the rotor core in a radial direction with respect to the first flux barrier, and
the first bridge includes:
a front bridge provided at a front in the rotation direction of the rotor; and
a rear bridge provided at a rear in the rotation direction of the rotor, and
wherein when a front reference location that is a reference location of the front bridge is an intersection point of a front imaginary line passing through a center axis of the rotor core and a front end of each set of the permanent magnets and an outer circumferential surface of the rotor core in a plane view in which the rotor is viewed from an axial direction, and a rear reference location that is a reference location of the rear bridge is an intersection point of a rear imaginary line passing through the center axis of the rotor core and a rear end of each set of the permanent magnets and the outer circumferential surface of the rotor core in the plane view,
in at least one set of the permanent magnets among the plurality of sets of the permanent magnets,
a rear end of the front bridge is disposed at a position away from the front reference location to the rear by θa/24 (radian) or more and θa/8 (radian) or less at a central angle about the center axis, and
a front end of the rear bridge is disposed at a position away from the rear reference location to the front by 0 (radian) or more and θa/12 (radian) or less at the central angle about the center axis,
where, θa satisfies Formula (1) described below, $$\theta a = 2\pi/(\mathrm{Nslot}) \tag{1}$$

where Nslot in Formula (1) described above means a number of slots of the stator.

2. The rotary electric machine according to claim 1, wherein
in the at least one of the plurality of sets of the permanent magnets,
the rear end of the front bridge is disposed at a position away from the front reference location to the rear by θa/12 (radian) at the central angle about the center axis, and
the front end of the rear bridge is disposed at the rear reference location.

3. The rotary electric machine according to claim 2, wherein
two permanent magnets form a set to constitute one magnetic pole,
each set of the permanent magnets includes a front magnet positioned at the front and a rear magnet positioned at the rear, the front magnet and the rear magnet are disposed in a V shape protruding inward in the radial direction in the plane view,
the front bridge is provided in front of the front magnet,
the rear bridge is provided in the rear of the rear magnet, and
in the plane view, the front imaginary line passes through the center axis and a front end of the front magnet, and the rear imaginary line passes through the center axis and a rear end of the rear magnet.

4. The rotary electric machine according to claim 1, wherein two permanent magnets form a set to constitute one magnetic pole, each set of the permanent magnets includes a front magnet positioned at the front and a rear magnet positioned at the rear, the front magnet and the rear magnet are disposed in a V shape protruding inward in the radial direction in the plane view, the front bridge is provided in front of the front magnet, the rear bridge is provided in the rear of the rear magnet, and in the plane view, the front imaginary line passes through the center axis and a front end of the front magnet, and the rear imaginary line passes through the center axis and a rear end of the rear magnet.

* * * * *